United States Patent
Liu et al.

(10) Patent No.: US 11,856,422 B2
(45) Date of Patent: Dec. 26, 2023

(54) BEAM FAILURE RECOVERY REQUEST SENDING AND RESPONSE METHODS AND DEVICES, AND STORAGE MEDIUM

(71) Applicant: BEIJING XIAOMI MOBILE SOFTWARE CO., LTD., Beijing (CN)

(72) Inventors: Chunhua Liu, Beijing (CN); Yajun Zhu, Beijing (CN); Ming Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 454 days.

(21) Appl. No.: 17/261,166

(22) PCT Filed: Jul. 20, 2018

(86) PCT No.: PCT/CN2018/096439
§ 371 (c)(1),
(2) Date: Jan. 18, 2021

(87) PCT Pub. No.: WO2020/014960
PCT Pub. Date: Jan. 23, 2020

(65) Prior Publication Data
US 2021/0289372 A1    Sep. 16, 2021

(51) Int. Cl.
*H04W 72/04* (2023.01)
*H04W 24/04* (2009.01)
*H04W 72/21* (2023.01)

(52) U.S. Cl.
CPC .......... *H04W 24/04* (2013.01); *H04W 72/21* (2023.01)

(58) Field of Classification Search
CPC ...... H04B 7/0695; H04B 7/088; H04W 72/02
See application file for complete search history.

(56) References Cited

U.S. PATENT DOCUMENTS

2018/0302889 A1 * 10/2018 Guo .................... H04W 72/046
2018/0323856 A1 * 11/2018 Xiong ................. H04W 74/004
(Continued)

FOREIGN PATENT DOCUMENTS

| CN | 104041163 A | 9/2014 |
| CN | 107079459 A | 8/2017 |

(Continued)

OTHER PUBLICATIONS

CN First Office Action in Application No. 201880001086.6, dated Aug. 2, 2019.
(Continued)

*Primary Examiner* — Fahmida S Chowdhury
(74) *Attorney, Agent, or Firm* — SYNCODA LLC; Feng Ma

(57) ABSTRACT

A beam failure recovery request sending method includes: after a beam failure event occurs in a terminal, searching for a candidate beam; and after at least one candidate beam is found, using a physical uplink control channel (PUCCH) resource to send a beam failure recovery request (BFRQ) to a base station, the PUCCH resource comprising a PUCCH resource pre-allocated to the terminal by the base station or a PUCCH resource in a preset format. The present disclosure achieves the purpose of transmitting a BFRQ using a PUCCH resource, making the time delay of transmitting a BFRQ small.

20 Claims, 10 Drawing Sheets

(56) References Cited

U.S. PATENT DOCUMENTS

| | | | |
|---|---|---|---|
| 2018/0367374 A1* | 12/2018 | Liu | H04W 16/28 |
| 2018/0368124 A1* | 12/2018 | Liu | H04W 72/21 |
| 2019/0053294 A1* | 2/2019 | Xia | H04B 7/0695 |
| 2019/0261280 A1* | 8/2019 | Jung | H04W 72/23 |
| 2019/0268893 A1* | 8/2019 | Tsai | H04W 16/28 |
| 2020/0059398 A1* | 2/2020 | Pan | H04B 7/0695 |
| 2020/0389220 A1* | 12/2020 | Kang | H04B 7/088 |
| 2021/0058129 A1* | 2/2021 | Takeda | H04B 7/088 |
| 2021/0058130 A1* | 2/2021 | Zhu | H04W 72/23 |
| 2021/0234752 A1* | 7/2021 | Matsumura | H04B 7/088 |

FOREIGN PATENT DOCUMENTS

| | | |
|---|---|---|
| CN | 108024366 A | 5/2018 |
| WO | 2018129300 A1 | 7/2018 |

OTHER PUBLICATIONS

International Search Report in Application No. PCT/CN2018/096439, dated Mar. 28, 2019.

3GPP TSG RAN WG1 Meeting #89, Hangzhou, China May 15-19, 2017, R1-1708135, Agenda Item 7.1.2.2.2, Source: Huawei, HiSilicon, Title: Beam failure recovery, Document for: Discussion and decision.

3GPP TSG RAN meeting #76, West Palm Beach, USA, Jun. 5-8, 2017, RP-171137, Status Report to TSG.

* cited by examiner

US 11,856,422 B2

BEAM FAILURE RECOVERY REQUEST SENDING AND RESPONSE METHODS AND DEVICES, AND STORAGE MEDIUM

CROSS-REFERENCE TO RELATED APPLICATIONS

This application is a U.S. national stage of International Application No. PCT/CN2018/096439 filed on Jul. 20, 2018, the disclosure of which is hereby incorporated by reference in its entirety.

TECHNICAL FIELD

The present disclosure relates to the field of communication technologies, and in particular, to a method for sending beam failure recovery request, a response method thereof, a device, and a storage medium.

BACKGROUND

In NR (New Radio) technologies, a beam failure recovery process includes four steps: a first step is beam failure detection, a base station explicitly or implicitly configures a beam failure detection reference signal set, and a UE (User Equipment) monitors all beams in the set, and if all of these beams fail, it is considered that a beam failure has occurred; a second step is candidate beam identification, the base station explicitly configures a candidate beam reference signal set, and the UE monitors all beams in the set, and if it is found that quality of at least one beam is higher than a pre-configured threshold value, it is considered that a new candidate beam is found; a third step is BFRQ (Beam Failure Recovery Request) transmission, when the first and second steps are both succeeded, the UE transmits the BFRQ to the base station so as to inform the base station of a beam failure event and available candidate beam information found; and a fourth step is the UE monitors a response of the base station to the BFRQ.

At present, PRACH (Physical Random-Access Channel) can be used for the BFRQ transmission. However, due to a long period of a PRACH resource, a period and time delay for transmitting BFRQ are long.

SUMMARY

To overcome problems in the related art, the present disclosure provides a method for sending beam failure recovery request, response method, device and storage medium.

According to a first aspect of the present disclosure, there is provided a beam failure recovery request sending method, which is applied to a terminal, and the method includes: searching for a candidate beam after a beam failure event occurs in the terminal; and using a physical uplink control channel (PUCCH) resource to send a beam failure recovery request (BFRQ) to a base station after finding at least one candidate beam, wherein the PUCCH resource includes a PUCCH resource pre-allocated for the terminal by the base station or a PUCCH resource in a preset format.

Optionally, the method further includes: receiving a first control signaling sent by the base station, wherein the first control signaling indicates a PUCCH resource for sending the BFRQ allocated for the terminal.

Optionally, the first control signaling also indicates a correspondence between the PUCCH resource and a terminal identification and an index of a candidate beam of the terminal, and the step of using a physical uplink control channel (PUCCH) resource to send a beam failure recovery request (BFRQ) to a base station includes: using a PUCCH resource corresponding to the terminal identification and the index of the candidate beam of the terminal to send the BFRQ to the base station.

Optionally, the first control signaling also indicates a correspondence between the PUCCH resource and a terminal identification, and the step of using a physical uplink control channel (PUCCH) resource to send a beam failure recovery request (BFRQ) to a base station includes: using a PUCCH resource corresponding to the terminal identification to send the BFRQ to the base station.

Optionally, the method further includes: receiving a second control signaling sent by the base station, wherein the second control signaling indicates a grant free transmission resource pool; and using a transmission resource in the grant free transmission resource pool to send a physical uplink shared channel (PUSCH) message to the base station when sending the BFRQ to the base station, or after sending the BFRQ to the base station, wherein the PUSCH message includes the terminal identification and an index of a candidate beam selected by the terminal.

Optionally, the method further includes: receiving a second control signaling sent by the base station, wherein the second control signaling indicates a grant free transmission resource pool; and using a transmission resource in the grant free transmission resource pool to send a physical uplink shared channel (PUSCH) message to the base station when sending the BFRQ to the base station, or after sending the BFRQ to the base station, wherein the PUSCH message includes the terminal identification, an index of at least one candidate beam selected by the terminal and quality information of each of the at least one candidate beam.

Optionally, the step of using a transmission resource in the grant free transmission resource pool to send a physical uplink shared channel (PUSCH) message to the base station includes: using the transmission resource in the grant free transmission resource pool to repeatedly send the PUSCH message to the base station until the number of times for sending the PUSCH message reaches a threshold or a feedback message to the PUSCH message is received from the base station.

Optionally, the PUCCH resource in the preset format includes: a PUCCH resource in a PUCCH format that is configured to carry multiple bits, when the PUCCH resource in the preset format is used to send the BFRQ to the base station, the BFRQ includes: an index of at least one candidate beam selected by the terminal and quality information of each of the at least one candidate beam.

According to a second aspect of the present disclosure, there is provided a beam failure recovery request response method, which is applied to a base station, and the method includes: receiving a beam failure recovery request BFRQ transmitted based on a physical uplink control channel (PUCCH) resource, wherein the PUCCH resource includes a PUCCH resource pre-allocated for a terminal by the base station or a PUCCH resource in a preset format; determining a terminal that has a beam failure and a candidate beam of the terminal; and sending a response message to the BFRQ to the terminal by the candidate beam.

Optionally, the method further includes: sending a first control signaling to at least one terminal, wherein the first control signaling indicates a PUCCH resource for sending the BFRQ allocated for the at least one terminal.

Optionally, the first control signaling also indicates a correspondence between a terminal identification and the PUCCH resource and the candidate beam of the terminal, and the step of determining a terminal that has a beam failure and a candidate beam of the terminal includes: determining a terminal identified by an identification corresponding to the PUCCH resource for transmitting the BFRQ as the terminal having beam failure; determining an index of a candidate beam corresponding to the PUCCH resource for transmitting the BFRQ and the terminal identification; and determining the candidate beam of the terminal according to the index of the candidate beam.

Optionally, the first control signaling also indicates a correspondence between a terminal identification and the PUCCH resource, and the step of determining a terminal that has a beam failure includes: determining a terminal identified by an identification corresponding to the PUCCH resource for transmitting the BFRQ as the terminal having beam failure.

Optionally, the method further includes: sending a second control signaling to the terminal, wherein the second control signaling indicates a grant free transmission resource pool; and receiving a PUSCH message sent by the terminal on a transmission resource in the grant free transmission resource pool, wherein the PUSCH message includes the terminal identification and an index of a candidate beam selected by the terminal.

Optionally, the step of determining a terminal that has a beam failure and a candidate beam of the terminal includes: determining a terminal identified by the identification in the PUSCH message as the terminal having beam failure; and determining the candidate beam of the terminal according to the index of the candidate beam in the PUSCH message.

Optionally, the method further includes: sending a second control signaling to the terminal, wherein the second control signaling indicates a grant free transmission resource pool; and receiving a PUSCH message sent by the terminal on a transmission resource in the grant free transmission resource pool, wherein the PUSCH message includes the terminal identification, an index of at least one candidate beam selected by the terminal and quality information of each of the at least one candidate beam.

According to a third aspect of the present disclosure, there is provided a beam failure recovery request sending device, which is applied to a terminal, and the device includes: a searching module, configured to search for a candidate beam after a beam failure event occurs in the terminal; and a first sending module, configured to use a physical uplink control channel (PUCCH) resource to send a beam failure recovery request (BFRQ) to a base station after finding at least one candidate beam, wherein the PUCCH resource includes a PUCCH resource pre-allocated for the terminal by the base station or a PUCCH resource in a preset format.

Optionally, the device further includes: a first receiving module, configured to receive a first control signaling sent by the base station, wherein the first control signaling indicates a PUCCH resource for sending the BFRQ allocated for the terminal.

Optionally, the first control signaling also indicates a correspondence between the PUCCH resource and a terminal identification and an index of a candidate beam of the terminal, and the sending module is configured to use a PUCCH resource corresponding to the terminal identification and the index of the candidate beam of the terminal to send the BFRQ to the base station.

Optionally, the first control signaling also indicates a correspondence between the PUCCH resource and a terminal identification, and the sending module is configured to use a PUCCH resource corresponding to the terminal identification to send the BFRQ to the base station.

Optionally, the device further includes: a second receiving module, configured to receive a second control signaling sent by the base station, wherein the second control signaling indicates a grant free transmission resource pool; a second sending module, configured to use a transmission resource in the grant free transmission resource pool to send a physical uplink shared channel (PUSCH) message to the base station when sending the BFRQ to the base station, or after sending the BFRQ to the base station, wherein the PUSCH message includes the terminal identification and an index of a candidate beam selected by the terminal.

Optionally, the device further includes: a third receiving module, configured to receive a second control signaling sent by the base station, wherein the second control signaling indicates a grant free transmission resource pool; and a third sending module, configured to use a transmission resource in the grant free transmission resource pool to send a physical uplink shared channel (PUSCH) message to the base station when sending the BFRQ to the base station, or after sending the BFRQ to the base station, wherein the PUSCH message includes the terminal identification, an index of at least one candidate beam selected by the terminal and quality information of each of the at least one candidate beam.

Optionally, the third sending module is configured to use the transmission resource in the grant free transmission resource pool to repeatedly send the PUSCH message to the base station until the number of times for sending the PUSCH message reaches a threshold or a feedback message to the PUSCH message is received from the base station.

Optionally, the PUCCH resource in the preset format includes: a PUCCH resource in a PUCCH format that is configured to carry multiple bits, when the PUCCH resource in the preset format is used to send the BFRQ to the base station, the BFRQ includes: an index of at least one candidate beam selected by the terminal and quality information of each of the at least one candidate beam.

According to a fourth aspect of the present disclosure, there is provided a beam failure recovery request response device, which is applied to a base station, and the device includes: a fourth receiving module, configured to receive a beam failure recovery request BFRQ transmitted based on a physical uplink control channel (PUCCH) resource, wherein the PUCCH resource includes a PUCCH resource pre-allocated for a terminal by the base station or a PUCCH resource in a preset format; a determining module, configured to determine a terminal that has a beam failure and a candidate beam of the terminal; and a fourth sending module, configured to send a response message to the BFRQ to the terminal by the candidate beam.

Optionally, the device further includes: a fifth sending module, configured to send a first control signaling to at least one terminal, wherein the first control signaling indicates a PUCCH resource for sending the BFRQ allocated for the at least one terminal.

Optionally, the first control signaling also indicates a correspondence between a terminal identification and the PUCCH resource and the candidate beam of the terminal, and the determining module includes: a first determining sub-module, configured to determine a terminal identified by an identification corresponding to the PUCCH resource for transmitting the BFRQ as the terminal having beam failure; a second determining sub-module, configured to determine an index of a candidate beam corresponding to the PUCCH resource for transmitting the BFRQ and the terminal identification; and a third determining sub-module, configured to determine the candidate beam of the terminal according to the index of the candidate beam.

Optionally, the first control signaling also indicates a correspondence between a terminal identification and the PUCCH resource, and the determining module is configured to determine a terminal identified by an identification corresponding to the PUCCH resource for transmitting the BFRQ as the terminal having beam failure.

Optionally, the device further includes: a sixth sending module, configured to send a second control signaling to the terminal, wherein the second control signaling indicates a grant free transmission resource pool; and a fifth receiving module, configured to receive a PUSCH message sent by the terminal on a transmission resource in the grant free transmission resource pool, wherein the PUSCH message includes the terminal identification and an index of a candidate beam selected by the terminal.

Optionally, the determining module includes: a fourth determining sub-module, configured to determine a terminal identified by the identification in the PUSCH message as the terminal having beam failure; and a fifth determining sub-module, configured to determine the candidate beam of the terminal according to the index of the candidate beam in the PUSCH message.

Optionally, the device further includes: a seventh sending module, configured to send a second control signaling to the terminal, wherein the second control signaling indicates a grant free transmission resource pool; and a sixth receiving module, configured to receive a PUSCH message sent by the terminal on a transmission resource in the grant free transmission resource pool, wherein the PUSCH message includes the terminal identification, an index of at least one candidate beam selected by the terminal and quality information of each of the at least one candidate beam.

According to a fifth aspect of the present disclosure, there is provided a beam failure recovery request sending device, which is applied to a terminal, and the device includes: a processor; and memory for storing executable instructions of the processor; wherein, the processor is configured to: search for a candidate beam after a beam failure event occurs in the terminal; and use a physical uplink control channel (PUCCH) resource to send a beam failure recovery request (BFRQ) to a base station after finding at least one candidate beam, wherein the PUCCH resource includes a PUCCH resource pre-allocated for the terminal by the base station or a PUCCH resource in a preset format.

According to a sixth aspect of the present disclosure, there is provided a non-transitory computer-readable storage medium. Instructions in the storage medium, when executed by a processor, cause the processor to execute the method according to the first aspect of the present disclosure.

According to a seventh aspect of the present disclosure, there is provided a beam failure recovery request response device, which is applied to a base station, and the device includes: a processor; and memory for storing executable instructions of the processor; wherein, the processor is configured to: receive a beam failure recovery request BFRQ transmitted based on a physical uplink control channel (PUCCH) resource, wherein the PUCCH resource includes a PUCCH resource pre-allocated for a terminal by the base station or a PUCCH resource in a preset format; determine a terminal that has a beam failure and a candidate beam of the terminal; and send a response message to the BFRQ to the terminal by the candidate beam.

According to an eighth aspect of the present disclosure, there is provided a non-transitory computer-readable storage medium. Instructions in the storage medium, when executed by a processor, cause the processor to execute the method according to the second aspect of the present disclosure.

Technical solutions provided by the embodiments of the present disclosure may include the following beneficial effects.

In the beam failure recovery request sending method of the embodiments of the present disclosure, after the candidate beam is found in a case where the terminal has beam failure, the PUCCH resource pre-allocated by the base station for the terminal or the PUCCH resource in the preset format is used to send the BFRQ to the base station, which achieves a purpose of using the PUCCH resource to transmit the BFRQ, so that a time delay of transmitting the BFRQ is small, and the base station can also know the terminal having beam failure and the candidate beam of the terminal in time, thereby facilitating to perform the beam failure recovery process in time by the base station.

It should be noted that the above general description and the following detailed description are merely exemplary and explanatory and should not be construed as limiting of the disclosure.

BRIEF DESCRIPTION OF THE DRAWINGS

The accompanying drawings here, which are incorporated in the specification and constitute a part of the specification, show exemplary embodiments of the present disclosure. The drawings along with the specification explain the principles of the present disclosure.

DETAILED DESCRIPTION

Exemplary embodiments will be described in detail herein, examples of which are illustrated in the accompanying drawings. The following description refers to the same or similar elements in the different figures unless otherwise indicated. The embodiments described in the following exemplary embodiments do not represent all embodiments consistent with the present disclosure. Instead, they are merely examples of devices and methods consistent with aspects of the present disclosure as detailed in the appended claims.

Figure 1:
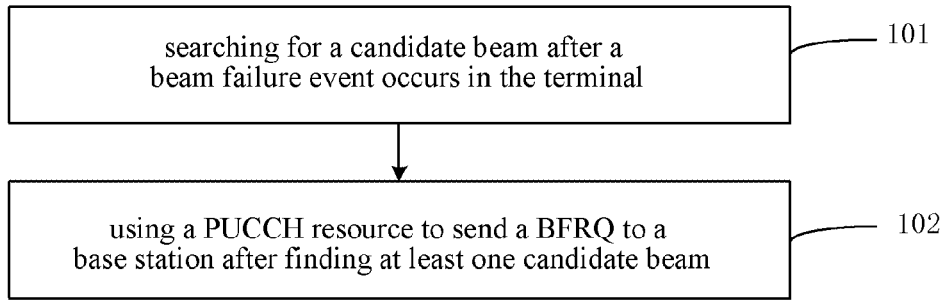
FIG. 1 is a flowchart showing a beam failure recovery request sending method according to an exemplary embodiment.

FIG. 1 is a flowchart showing a beam failure recovery request sending method according to an exemplary embodiment. The method is applied to a terminal, that is, the method can be executed by the terminal. As shown in FIG. 1, the method includes:

in step 101, a candidate beam is searched for after a beam failure event occurs in the terminal.

In an implementation, the candidate beam searched by the terminal is a currently available candidate beam.

In step 102, a physical uplink control channel (PUCCH) resource is used to send a BFRQ to a base station after finding at least one candidate beam, and the PUCCH resource includes a PUCCH resource pre-allocated for the terminal by the base station or a PUCCH resource in a preset format.

In an implementation, the BFRQ may include at least a beam failure event, and may also include an index of a candidate beam selected by the terminal.

In an implementation, the base station can semi-statically or dynamically configure the PUCCH resource for transmitting the BFRQ for the terminal through a RRC (Radio Resource Control) signaling, a MAC (Medium/Media Access Control) CE (control element) or a physical layer signaling.

In an implementation, the PUCCH resource for transmitting the BFRQ pre-allocated by the base station for the terminal may include a SR (Scheduling Request, scheduling request) resource.

In an implementation, after finding one candidate beam in a case where a beam failure event occurs, the terminal can use the PUCCH resource to send the BFRQ to the base station, and can also use the PUCCH resource to send the BFRQ to the base station after finding multiple candidate beams.

In an implementation, after the step 102, the terminal may monitor a response message of the base station to the BFRQ, and receive the response message after monitoring the response message.

In the beam failure recovery request sending method of the embodiments of the present disclosure, after the candidate beam is found in a case where the terminal has beam failure, the PUCCH resource pre-allocated by the base station for the terminal or the PUCCH resource in the preset format is used to send the BFRQ to the base station, which achieves a purpose of using the PUCCH resource to transmit the BFRQ, so that a time delay of transmitting the BFRQ is small, and the base station can also know the terminal having beam failure and the candidate beam of the terminal in time, thereby facilitating to perform the beam failure recovery process in time by the base station.

Figure 2:
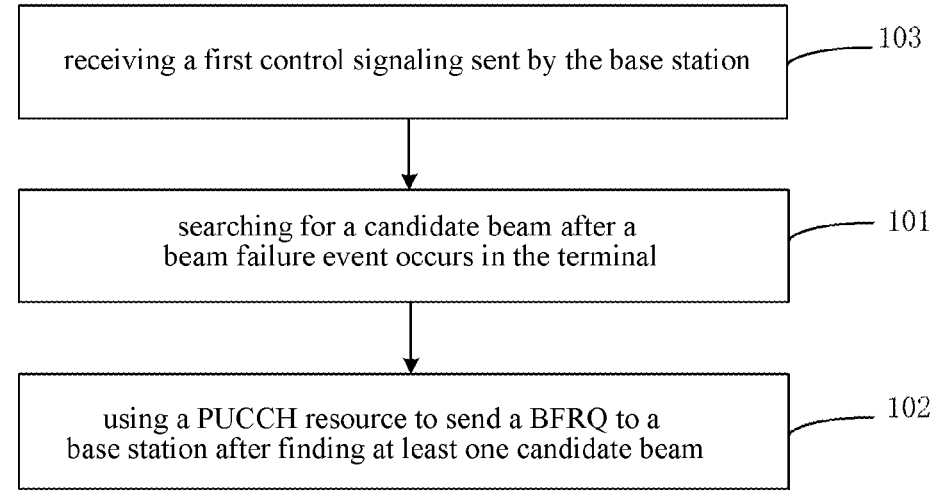
FIG. 2 is a flowchart showing a beam failure recovery request sending method according to an exemplary embodiment.

FIG. 2 is a flowchart showing a beam failure recovery request sending method according to an exemplary embodiment. As shown in FIG. 2, on the basis of the steps 101 and 102, the method may further include: in step 103, a first control signaling sent by the base station is received, and the first control signaling indicates a PUCCH resource for sending the BFRQ allocated for the terminal, and the PUCCH resource may include at least one of a time domain resource, a frequency domain resource, or a code domain resources. The base station can semi-statically or dynamically configure the PUCCH resource for transmitting the BFRQ for the terminal through the RRC signaling, the MAC CE or the physical layer signaling. This embodiment does not limit an order of execution of step 103, step 101, and step 102. FIG. 2 only shows a case where the step 103 is executed before the steps 101 and 102.

Figure 3:
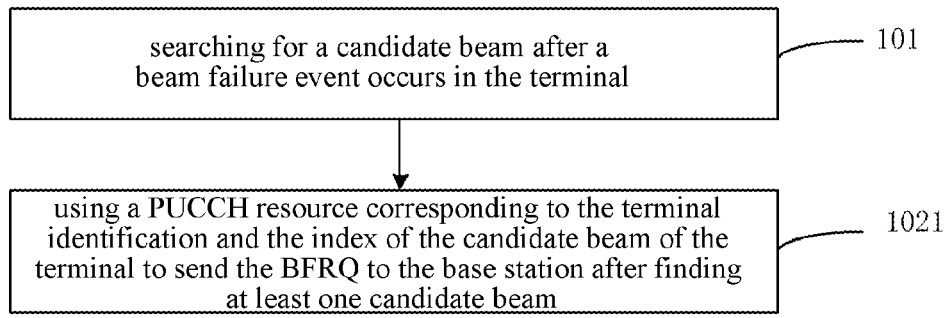
FIG. 3 is a flowchart showing a beam failure recovery request sending method according to an exemplary embodiment.

In an implementation, the first control signaling sent by the base station to the terminal may also indicate a correspondence between the PUCCH resource and a terminal identification and an index of a candidate beam of the terminal. For example, the first control signal indicates respective PUCCH resources corresponding to a certain candidate beam of a certain terminal. In addition, the correspondence may also be pre-agreed by the base station and the terminal. For example, the correspondence may be specified in a protocol. Based on this correspondence, when the terminal plans to send the BFRQ to the base station, it can find the PUCCH resource allocated by the base station for transmitting the BFRQ according to its own identification. FIG. 3 is a flowchart showing a beam failure recovery request sending method according to an exemplary embodiment. In this method, using the PUCCH resource to send the BFRQ to the base station may include: in step 1021, a PUCCH resource corresponding to the terminal identification and the index of the candidate beam of the terminal is used to send the BFRQ to the base station. Based on this, after receiving the BFRQ, the base station can obtain the index of the candidate beam of the terminal according to the correspondence between the index of the candidate beam and the PUCCH resource. In this case, when the terminal sends the BFRQ to the base station, there is no need for the BFRQ carrying information of the candidate beam, and after receiving the BFRQ, the base station can determine the terminal identification based on the correspondence between the PUCCH resource sending the BFRQ and the terminal identification, so that it is determined that the terminal identified by the identification is the terminal having beam failure.

Figure 4:
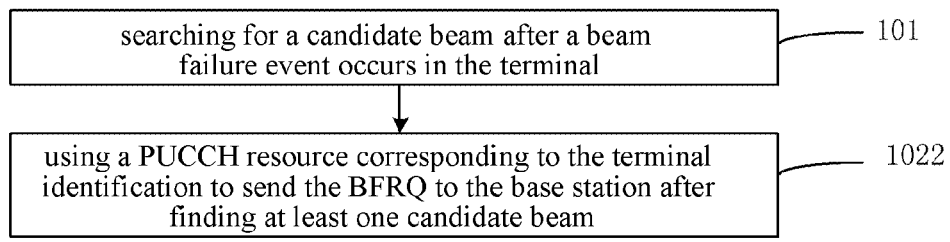
FIG. 4 is a flowchart showing a beam failure recovery request sending method according to an exemplary embodiment.

In an implementation, the first control signaling sent by the base station to the terminal may also indicate a correspondence between the PUCCH resource and the terminal identification, and the correspondence may also be pre-agreed by the base station and the terminal. For example, the correspondence may be specified in a protocol. Based on this correspondence, when the terminal plans to send the BFRQ to the base station, it can find the PUCCH resource allocated by the base station for transmitting the BFRQ according to its own identification. FIG. 4 is a flowchart showing a beam failure recovery request sending method according to an exemplary embodiment. As shown in FIG. 4, in this method, using the PUCCH resource to send the BFRQ to the base station may include: in step 1022, a PUCCH resource corresponding to the terminal identification is used to send the BFRQ to the base station. Based on this, after receiving the BFRQ, the base station can determine the terminal identification according to the correspondence between the PUCCH resource sending the BFRQ and the terminal identification, so that it is determined that the terminal identified by the identification is the terminal having beam failure.

Figure 5:
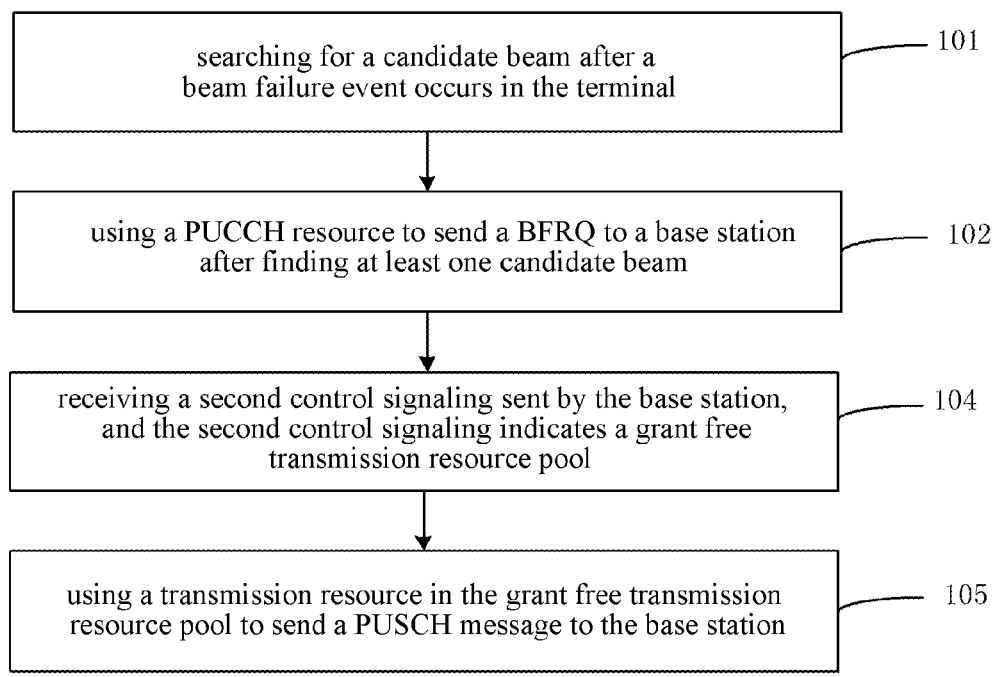
FIG. 5 is a flowchart showing a beam failure recovery request sending method according to an exemplary embodiment.

FIG. 5 is a flowchart showing a beam failure recovery request sending method according to an exemplary embodiment. As shown in FIG. 5, the method further includes, on the basis of the steps 101 and 102: in step 104, a second control signaling sent by the base station is received, and the second control signaling indicates a grant free transmission resource pool (also called scheduling-free transmission resource pool). The resource pool may be a grant free transmission resource pool allocated by the base station for the terminal, or a grant free transmission resource pool allocated by the base station for multiple terminals. When there is data for the terminal to be transmitted, a transmission resource in the resource pool can be used for transmission. The second control signaling may be, for example, the RRC signaling, the base station can semi-statically configure the transmission resource pool for the terminal through the RRC signaling, and the transmission resource in the transmission resource pool can include the time domain resource and the code domain resource; in step 105, the transmission resource in the grant free transmission resource pool is used to send a physical uplink shared channel (PUSCH) message to the base station when the BFRQ is sent to the base station, or after the BFRQ is sent to the base station. The PUSCH message includes the terminal identification and an index of a candidate beam selected by the terminal. It should be noted that the steps 104 and 105 can occur before the steps 101 and 102, and can also occur after the steps 101 and 102, FIG. 5 only shows a case where the steps 104 and 105 occur after the steps 101 and 102. When the terminal sends the BFRQ to the base station immediately after finding the candidate beam, the index of the candidate beam in the PUSCH message is the index of the candidate beam found by the terminal. When the terminal sends the BFRQ to the base station after finding multiple candidate beams, the index of the candidate beam in the PUSCH message is an index of one candidate beam selected by the terminal from the multiple candidate beams found. After receiving the PUSCH message, the base station may determine the candidate beam corresponding to the index of the candidate beam in the PUSCH message as the candidate beam of the terminal. The base station can also determine the terminal having beam failure according to the terminal identification in the PUSCH message.

Figure 6:
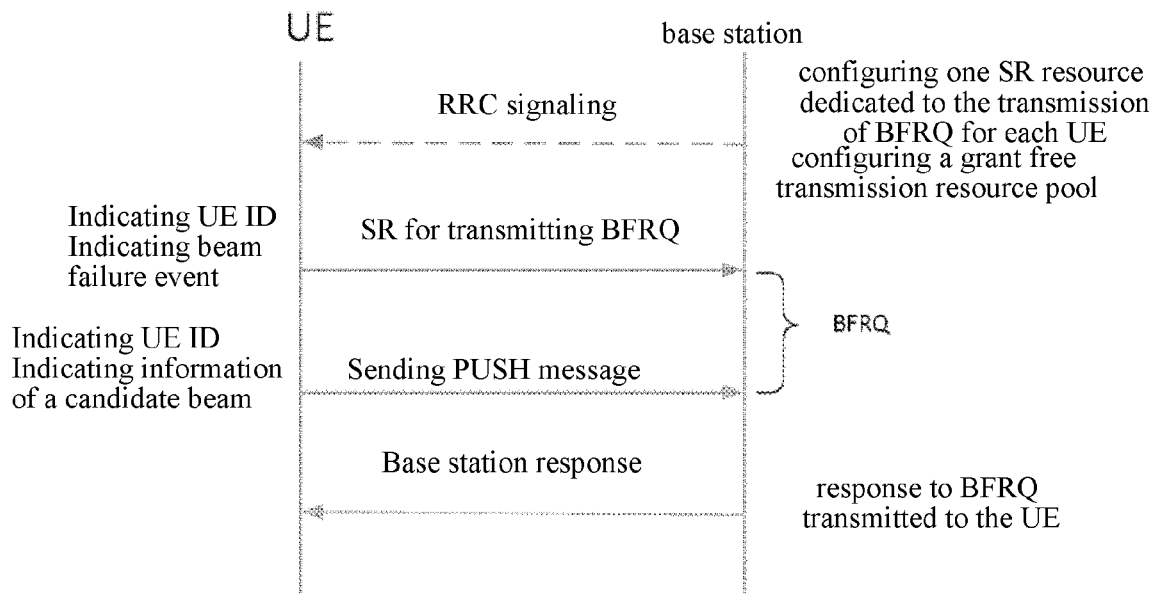
FIG. 6 is a flowchart showing a beam failure recovery request sending method according to an exemplary embodiment.

In an implementation, the beam failure recovery request sending method may include: using, by the terminal, the PUCCH resource configured by the base station to report the beam failure event to the base station, and using the transmission resource in the scheduling-free transmission resource pool configured by the base station to report the index of one candidate beam selected by the terminal the base station. The method will be described by an example below with reference to FIG. 6. As shown in FIG. 6, in this example, the base station semi-statically configures the SR resource for transmitting the BFRQ for the terminal through the RRC signaling, and different UE (terminal) IDs (identification) correspond to different time domain resources and/or frequency domain resources. In addition, the base station also semi-statically configures one grant free transmission resource pool for the UE through the RRC signaling. After the UE discovers the beam failure event and finds one available candidate beam, the UE finds the corresponding SR resource for transmitting the BFRQ according to its own UE ID. The BFRQ can only be used for informing the base station that the beam failure event occurs in the UE. After sending the BFRQ on the SR resource, the UE will send the PUSCH message to the base station on the grant free transmission resource pool. The PUSCH message may include the UE ID and the index of the candidate beam selected by the UE. The base station blindly checks the SR. When receiving the BFRQ transmitted through the SR resource and discovering a certain UE has the beam failure, the base station receives the PUSCH message sent by the UE on the grant free resource pool. When identifying the UE with the beam failure and the index of the candidate beam reported by the UE according to the PUSCH message, the base station can perform a subsequent beam failure recovery process.

Based on an implementation, the present disclosure also provides a beam failure recovery request sending method, which is substantively the same as the method shown in FIG. 5, except that in this method, the PUSCH message includes the terminal identification, an index of at least one candidate beam selected by the terminal and quality information of each of the at least one candidate beam. For the part of the method same as the method shown in FIG. 5, reference may be made to the description of the method shown in FIG. 5. In addition to the steps 101 and 102, the method may further include: receiving the second control signaling sent by the base station, and the second control signaling indicates the grant free transmission resource pool; and using the transmission resource in the grant free transmission resource pool to send the PUSCH message to the base station when sending the BFRQ to the base station, or after sending the BFRQ to the base station, and the PUSCH message includes the terminal identification, the index of at least one candidate beam selected by the terminal and the quality information of each of the at least one candidate beam. The quality information may be, for example, L1-RSRP (RSRP (Reference Signal Receiving Power) measured on a physical layer) corresponding to the candidate beam.

In an implementation, the beam failure recovery request sending method may include: using, by the terminal, the PUCCH resource configured by the base station to report the beam failure event to the base station, and using the transmission resource in the scheduling-free transmission resource pool configured by the base station to report the quality information of multiple candidate beams selected by the terminal. The method is described below through an example. In this example, the base station semi-statically configures the SR resource for transmitting the BFRQ for the terminal through the RRC signaling, which may include the time domain resource and/or the frequency domain resource. In addition to this, the base station also semi-statically configures one grant free transmission resource pool for the UE through the RRC signaling. After the UE discovers the beam failure event and finds the available candidate beam, the UE finds the corresponding SR resource for transmitting the BFRQ according to its own UE ID, and the BFRQ can only be used for informing the base station that the UE has the beam failure event. After the UE sends the BFRQ on the SR resource, the UE will transmit the PUSCH on the grant free transmission resource pool, and the PUSCH includes the UE ID and specific information of the candidate beam selected by the UE, for example, including the L1-RSRP corresponding to each candidate beam. The base station blindly checks the SR, and when discovering a certain UE has the beam failure, the base station receives the candidate beam information reported by the UE on the grant free resource pool. After identifying the UE having beam failure and the candidate beam information reported by the UE, the base station starts to perform the subsequent beam failure recovery process.

Figure 7:
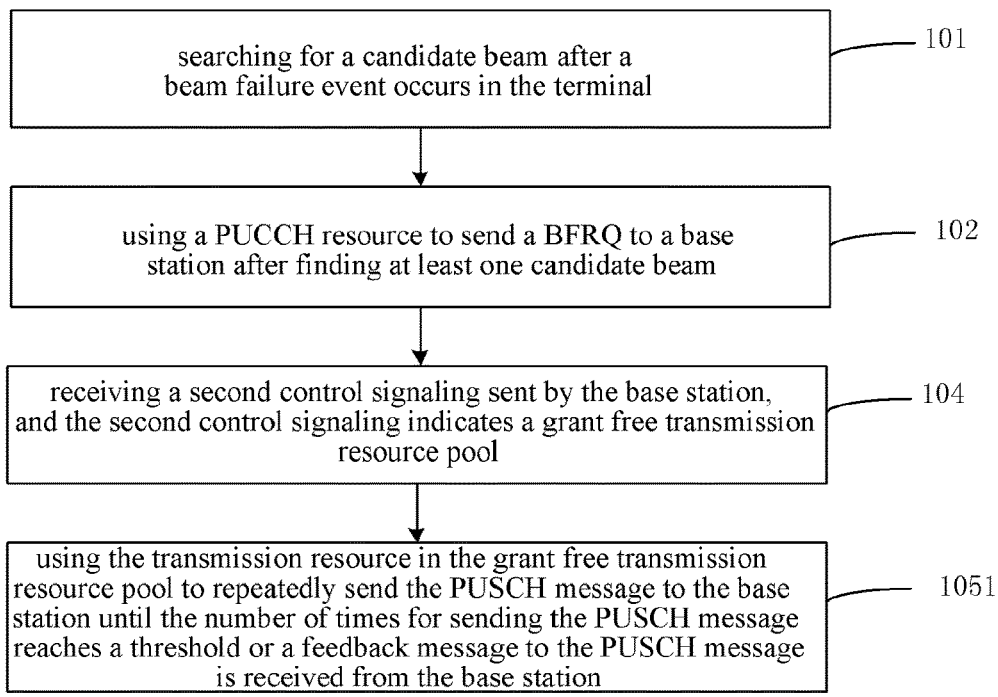
FIG. 7 is a flowchart showing a beam failure recovery request response method according to an exemplary embodiment.

When the terminal uses the transmission resource in the scheduling-free transmission resource pool to send a message to the base station, on the one hand, since the base station does not know when the terminal sends the message, it may lead to missed detection of the terminal message; on the other hand, since multiple terminals may send messages on one resource simultaneously, the base station may not be able to correctly decode the messages sent by the multiple terminals. To ensure that the message sent by the terminal can be correctly decoded by the base station, the terminal can repeatedly perform sending multiple times when using the transmission resource in the scheduling-free transmission resource pool to send the PUSCH message. As shown in FIG. 7, using the transmission resource in the grant free transmission resource pool to send the PUSCH message to the base station may also include: in step 1051, the transmission resource in the grant free transmission resource pool is used to repeatedly send the PUSCH message to the base station until the number of times for sending the PUSCH message reaches a threshold or a feedback message to the PUSCH message is received from the base station. The threshold may be pre-agreed by the terminal and the base station, and the base station may also configure the threshold for the terminal.

In an implementation, the PUCCH resource in the preset format may include: a PUCCH resource in a PUCCH format that is configured to carry multiple bits, when the PUCCH resource in the preset format is used to send the BFRQ to the base station, the BFRQ sent by the terminal to the base station includes: an index of at least one candidate beam selected by the terminal and quality information of each of the at least one candidate beam. The quality information may be for example L1-RSRP. Since each terminal has different PUCCH transmission resources, after receiving the BFRQ sent by the terminal, the base station can obtain the terminal identification according to the PUCCH resource, so as to determine the terminal having beam failure. The PUCCH resource in the preset format may be for example a PUCCH resource in the PUCCH format used for reporting the candidate beam in the related art. In order to distinguish the PUCCH used for transmitting the BFRQ from the PUCCH used for reporting the candidate beam, a flag (flag bit) is defined in the PUCCH format of the PUCCH resource for transmitting the BFRQ. For example, a 1-bit flag bit is defined, and the flag bit is used for identifying the PUCCH resource for transmitting BFRQ.

Figure 8:
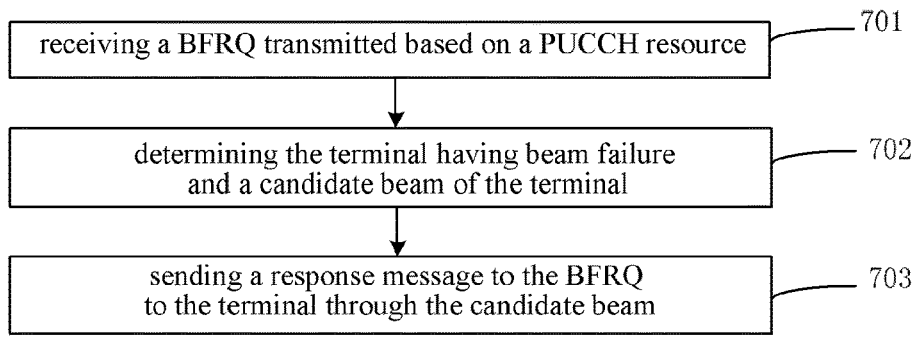
FIG. 8 is a flowchart showing a beam failure recovery request response method according to an exemplary embodiment.

FIG. 8 is a flowchart showing a beam failure recovery request response method according to an exemplary embodiment. The method is applied to a base station, that is, the method can be executed by the base station. As shown in FIG. 8, the method includes:

In step 701, a BFRQ transmitted based on a PUCCH resource is received, and the PUCCH resource is a PUCCH resource pre-allocated for a terminal by the base station or a PUCCH resource in a preset format.

In an implementation, the base station can semi-statically or dynamically configure the PUCCH resource for transmitting the BFRQ for the terminal through the RRC signaling, the MAC CE, or the physical layer signaling, and the PUCCH resource in the preset format may include a PUCCH resource being able to carrying multiple bits, so that the base station can know the terminal having beam failure and the candidate beam of the terminal in time, thereby facilitating to perform the beam failure recovery process in time by the base station.

In an implementable manner, the PUCCH resources pre-allocated by the base station for the terminal may include the SR resource.

In an implementable manner, the base station may determine whether content of the PUCCH message includes the BFRQ by blindly checking the PUCCH message from the terminal to obtain the BFRQ sent by the terminal.

In the Step 702, a terminal that has a beam failure and a candidate beam of the terminal are determined.

In an implementation, the base station can determine the terminal having beam failure based on the PUCCH resource that sends the BFRQ, and can also determine the terminal having failure based on the terminal identification in the BFRQ.

In the step 703, a response message to the BFRQ is sent to the terminal by the candidate beam.

Through the beam failure recovery request response method of the embodiments of the present disclosure, the base station receives the BFRQ transmitted by the terminal through the PUCCH resource pre-allocated by the base station or the PUCCH resource in the preset format, which achieves a purpose of using the PUCCH resource to transmit the BFRQ, so that a time delay of transmitting the BFRQ is small.

Figure 9:
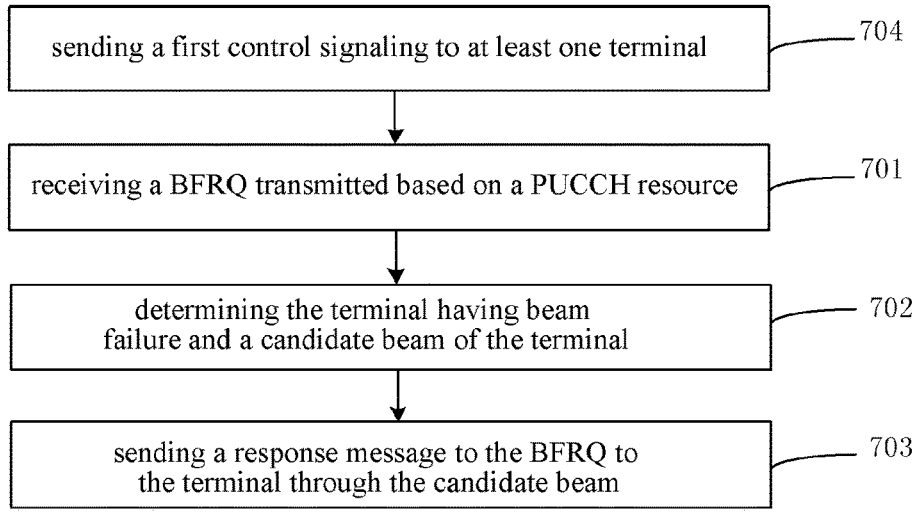
FIG. 9 is a schematic diagram showing a correspondence between a terminal identification and an index of a candidate beam and a SR resource according to an exemplary embodiment.
Figure 10:
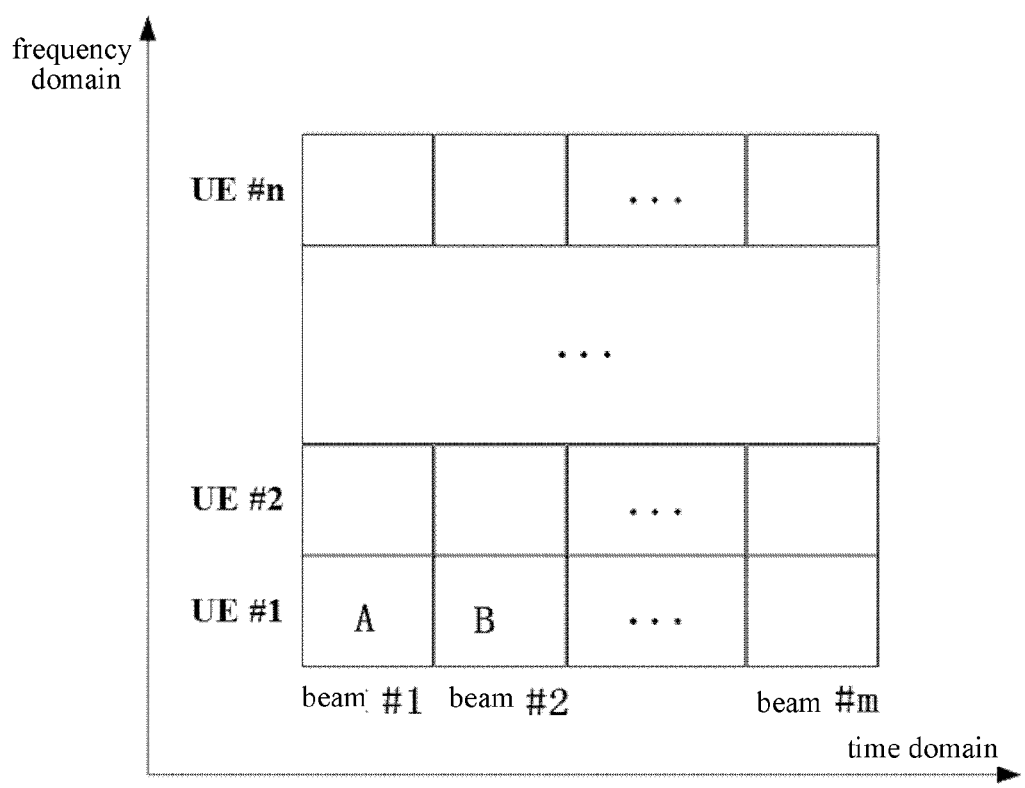
FIG. 10 is a flowchart showing a beam failure recovery request response method according to an exemplary embodiment.

FIG. 9 is a flowchart showing a beam failure recovery request response method according to an exemplary embodiment. As shown in FIG. 9, the method may, on the basis of the steps 701 to 703, further include: in step 704, a first control signaling is sent to at least one terminal, and the first control signaling indicates a PUCCH resource for sending the BFRQ allocated for the at least one terminal. This embodiment does not limit an order of the execution between the step 704 and the steps 701 to 703, and FIG. 9 only shows a case where the step 704 is executed before the step 701. The PUCCH resource may include the time domain resource, the frequency domain resource, or the code domain resource, etc. and the base station may semi-statically or dynamically configure the PUCCH resource for transmitting the BFRQ for the terminal through the RRC signaling, the MAC CE, or the physical layer signaling. For example, when the PUCCH resource for sending the BFRQ allocated for the terminal are the SR resource, the base station can semi-statically configure the SR resource for transmitting the BFRQ for the terminal through the RRC signaling, which may include a time-frequency domain resource, and each SR resource and an index of a certain candidate beam of a certain terminal have a one-to-one correspondence. As shown in FIG. 10, the SR resource A corresponds to the candidate beam with a number 1 and the UE identified by a numeral reference 1, and the SR resource B corresponds to the candidate beam with a number 2 and the UE identified by a numeral reference 1.

Figure 11:
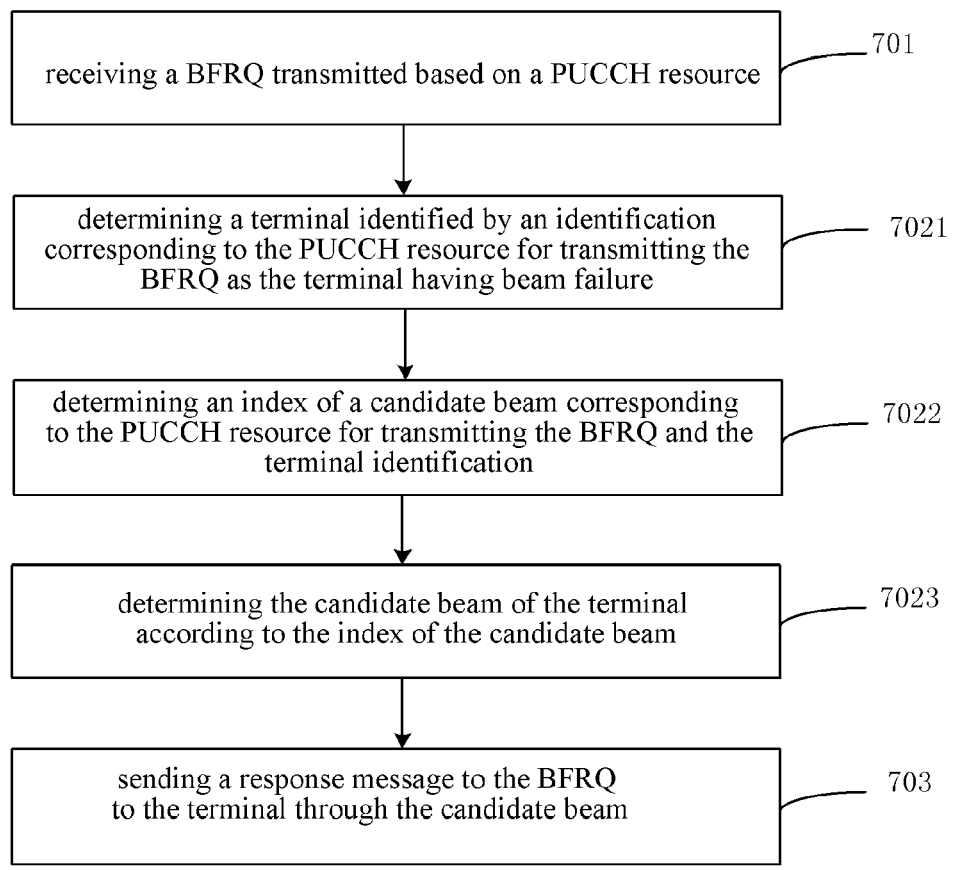
FIG. 11 is a flowchart showing a beam failure recovery request response method according to an exemplary embodiment.

In an implementation, the first control signaling may also indicate a correspondence between a terminal identification and the PUCCH resource and the candidate beam of the terminal. For example, the first control signal indicates respective PUCCH resources corresponding to a certain candidate beam of a certain terminal. In addition, the correspondence may also be pre-agreed by the base station and the terminal. FIG. 11 is a flowchart showing a beam failure recovery request response method according to an exemplary embodiment. As shown in FIG. 11, determining the terminal having beam failure and the candidate beam of the terminal may include: in step 7021, a terminal identified by an identification corresponding to the PUCCH resource for transmitting the BFRQ is determined as the terminal having beam failure; the PUCCH resource for transmitting the BFRQ is one of the PUCCH resources for transmitting BFRQ allocated by the base station for the terminal through the first control signaling, the base station can know the terminal identification according to the correspondence between the PUCCH resource and the terminal identification, so that it is determined that the terminal identified by the identification is the terminal having beam failure; in step 7022, an index of a candidate beam corresponding to the PUCCH resource for transmitting the BFRQ and the terminal identification is determined; in step 7023, the candidate beam of the terminal is determined according to the index of the candidate beam.

In an implementation, the first control signaling may also indicate a correspondence between the terminal identification and the PUCCH resource. For example, the first control signaling may include a correspondence between one terminal identification and multiple PUCCH resources, and the first control signaling may also include correspondences between multiple terminal identification and multiple PUCCH resources. Determining the terminal having beam failure includes: determining a terminal identified by an identification corresponding to the PUCCH resource for transmitting the BFRQ as the terminal having beam failure. The difference between the method in this embodiment and the method shown in FIG. 11 is that the first control signaling does not indicate the correspondence between the candidate beam of the terminal and the terminal identification and the PUCCH resource. Accordingly, in the method in this embodiment, after the terminal sends the BFRQ to the base station, the terminal can also report its own candidate beam to the base station, and the base station learns the candidate beam of the terminal according to the content reported by the terminal.

Figure 12:
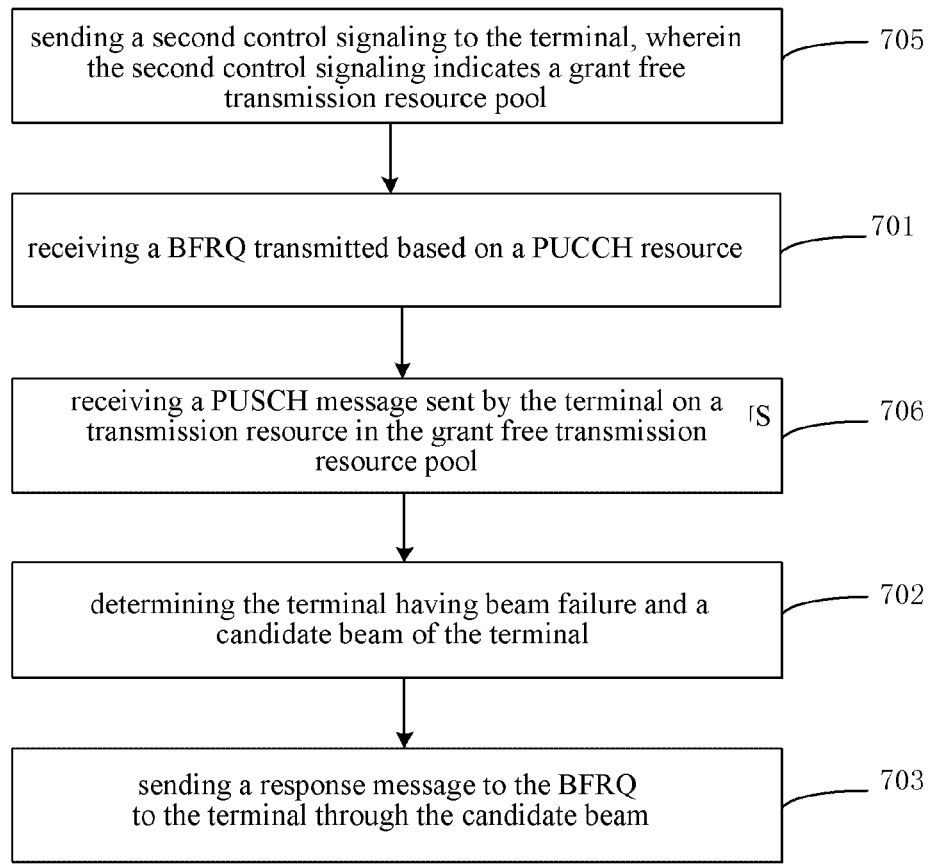
FIG. 12 is a flowchart showing a beam failure recovery request response method according to an exemplary embodiment.

FIG. 12 is a flowchart showing a beam failure recovery request response method according to an exemplary embodiment. As shown in FIG. 12, the method may, on the basis of the steps 701 to 703, further include: in step 705, a second control signaling is sent to the terminal, and the second control signaling indicates a grant free transmission resource pool; the second control signaling may be, for example, the RRC signaling, the base station can semi-statically configure the transmission resource pool for the terminal through the RRC signaling, and the transmission resource in the transmission resource pool can include the time domain resource and the code domain resource; in step 706, the PUSCH message sent by the terminal is received on the transmission resource in the grant free transmission resource pool, and the PUSCH message includes the terminal identification and the index of the candidate beam selected by the terminal. Through the steps 705 and 706, a purpose of the terminal reporting its candidate beam to the base station can be achieved. For the PUSCH message here, reference may be made to the description of the PUSCH message in the method shown in FIG. 5 above. It should be noted that the step 706 can be performed simultaneously with the step 701, or can be performed after the step 701, and FIG. 12 only shows a case where the step 706 is performed after the step 701.

Figure 13:
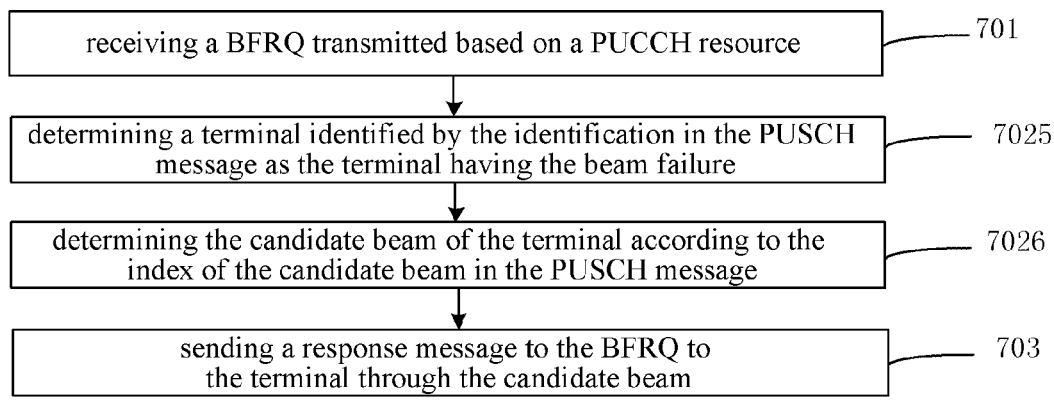
FIG. 13 is a flowchart showing a beam failure recovery request response method according to an exemplary embodiment.

FIG. 13 is a flowchart showing a beam failure recovery request response method according to an exemplary embodiment. As shown in FIG. 13, in the method, determining the terminal having beam failure and the candidate beam of the terminal may include: in step 7025, it is determined that the terminal identified by the identification in the PUSCH message is the terminal having beam failure; in step 7026, the candidate beam of the terminal is determined according to the index of the candidate beam in the PUSCH message. In this method, the base station receives the BFRQ reported by the terminal while receiving the PUSCH message or before receiving the PUSCH message, and the BFRQ may only include the information of the beam failure event. The base station combines the received BFRQ and the PUSCH message to determine the terminal having beam failure and the candidate beam corresponding to the terminal.

The present disclosure also provides another beam failure recovery request response method. The difference between this method and the method shown in FIG. 12 is that in this method, the PUSCH message includes the terminal identification, the index of at least one candidate beam selected by the terminal and quality information of each of the at least one candidate beam. For the part of the method same as the method shown in FIG. 12, reference may be made to the description of the method shown in FIG. 12. In addition to the steps 701 and 703, the method may further include: sending the second control signaling to the terminal, and the second control signaling indicates the grant free transmission resource pool; receiving the PUSCH message sent by the terminal on the transmission resource in the grant free transmission resource pool, and the PUSCH message includes the terminal identification, the index of at least one candidate beam selected by the terminal and the quality information of each of the at least one candidate beam. The quality information may be for example, the L1-RSRP corresponding to the candidate beam. After receiving the PUSCH message, the base station may select one candidate beam indicated in the PUSCH message as the candidate beam of the terminal according to the quality information of each candidate beam and a screening rule preset by the base station.

Regarding the device according to the above embodiments, the specific manner in which each of the modules performs operation has been described in detail in the embodiments of the relative methods, which will not be repeated here.

Figure 14:
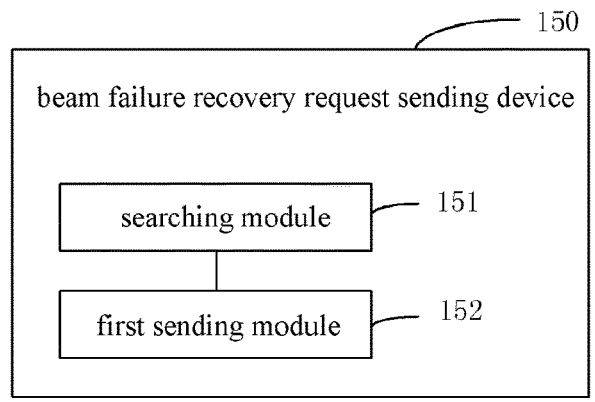
FIG. 14 is a block diagram showing a beam failure recovery request sending device according to an exemplary embodiment.

FIG. 14 is a block diagram showing a beam failure recovery request sending device according to an exemplary embodiment. The device is applied to a terminal. As shown in FIG. 14, the device 150 includes: a searching module 151, configured to search for a candidate beam after a beam failure event occurs in the terminal; and a first sending module 152, configured to use a physical uplink control channel (PUCCH) resource to send a beam failure recovery request (BFRQ) to a base station after finding at least one candidate beam, wherein the PUCCH resource includes a PUCCH resource pre-allocated for the terminal by the base station or a PUCCH resource in a preset format.

Figure 15:
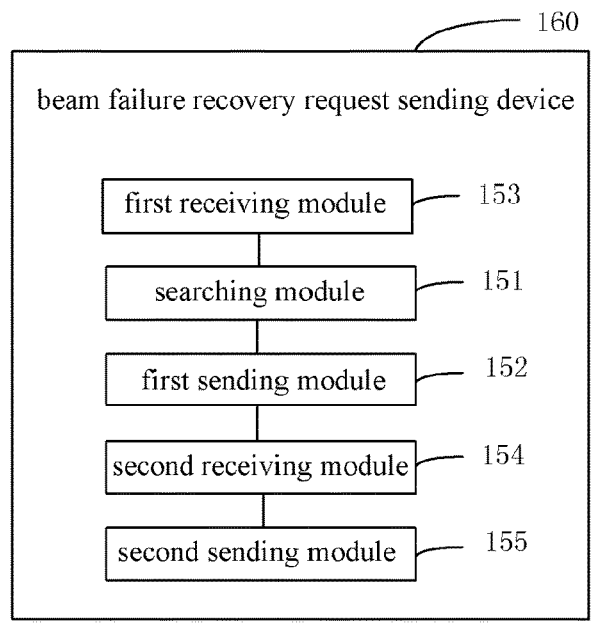
FIG. 15 is a block diagram showing a beam failure recovery request sending device according to an exemplary embodiment.

FIG. 15 is a block diagram showing a beam failure recovery request sending device according to an exemplary embodiment. As shown in FIG. 15, the device 160 may further include, on the basis of the device 150, a first receiving module 153, configured to receive a first control signaling sent by the base station, wherein the first control signaling indicates a PUCCH resource for sending the BFRQ allocated for the terminal.

In an implementation, the first control signaling also indicates a correspondence between the PUCCH resource and a terminal identification and an index of a candidate beam of the terminal, and based on this, the sending module is configured to use a PUCCH resource corresponding to the terminal identification and the index of the candidate beam of the terminal to send the BFRQ to the base station.

In an implementation, the first control signaling also indicates a correspondence between the PUCCH resource and a terminal identification, and based on this, the sending module is configured to use a PUCCH resource corresponding to the terminal identification to send the BFRQ to the base station.

In an implementable manner, as shown in FIG. 15, the device 160 may further include: a second receiving module 154, configured to receive a second control signaling sent by the base station, wherein the second control signaling indicates a grant free transmission resource pool; a second sending module 155, configured to use a transmission resource in the grant free transmission resource pool to send a physical uplink shared channel (PUSCH) message to the base station when sending the BFRQ to the base station, or after sending the BFRQ to the base station, wherein the PUSCH message includes the terminal identification and an index of a candidate beam selected by the terminal.

In an implementable manner, the beam failure recovery request sending device may further include: a third receiving module, configured to receive a second control signaling sent by the base station, wherein the second control signaling indicates a grant free transmission resource pool; and a third sending module, configured to use a transmission resource in the grant free transmission resource pool to send a physical uplink shared channel (PUSCH) message to the base station when sending the BFRQ to the base station, or after sending the BFRQ to the base station, wherein the PUSCH message includes the terminal identification, an index of at least one candidate beam selected by the terminal and quality information of each of the at least one candidate beam.

In an implementation, the third sending module is configured to use the transmission resource in the grant free transmission resource pool to repeatedly send the PUSCH message to the base station until the number of times for sending the PUSCH message reaches a threshold or a feedback message to the PUSCH message is received from the base station.

In an implementation, the PUCCH resource in the preset format includes: a PUCCH resource in a PUCCH format that is configured to carry multiple bits, when the PUCCH resource in the preset format is used to send the BFRQ to the base station, the BFRQ includes: an index of at least one candidate beam selected by the terminal and quality information of each of the at least one candidate beam.

Figure 16:
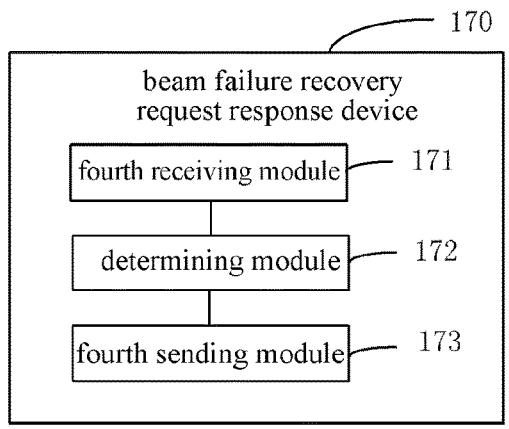
FIG. 16 is a block diagram showing a beam failure recovery request response device according to an exemplary embodiment.

FIG. 16 is a block diagram showing a beam failure recovery request response device according to an exemplary embodiment. The device is applied to a base station. As shown in FIG. 16, the device 170 includes: a fourth receiving module 171, configured to receive a beam failure recovery request BFRQ transmitted based on a physical uplink control channel (PUCCH) resource, wherein the PUCCH resource includes a PUCCH resource pre-allocated for a terminal by the base station or a PUCCH resource in a preset format; a determining module 172, configured to determine a terminal that has a beam failure and a candidate beam of the terminal; and a fourth sending module 173, configured to send a response message to the BFRQ to the terminal by the candidate beam.

Figure 17:
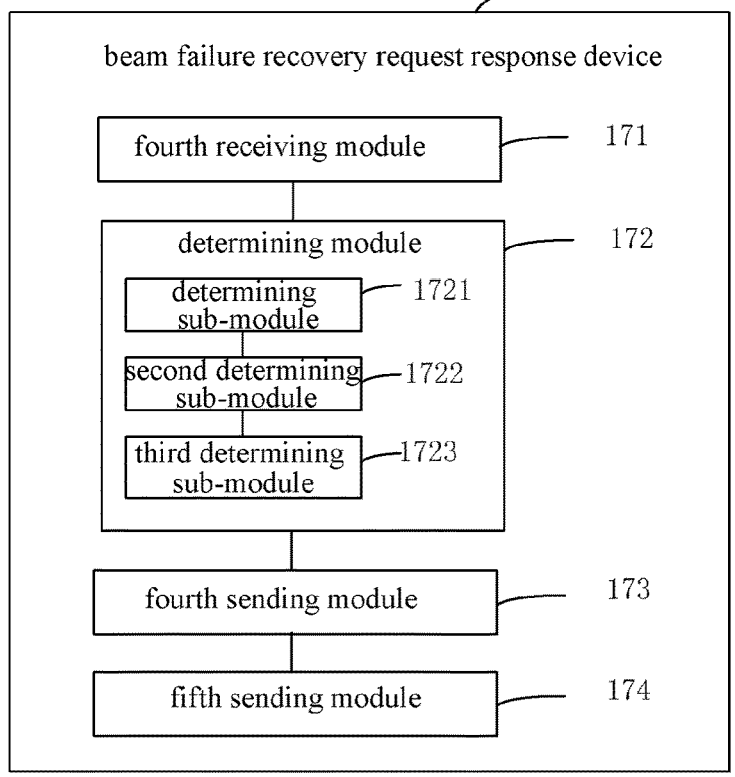
FIG. 17 is a block diagram showing a beam failure recovery request response device according to an exemplary embodiment.

FIG. 17 is a block diagram showing a beam failure recovery request response device according to an exemplary embodiment. As shown in FIG. 17, on the basis of the device 170, the device 180 may further include: a fifth sending module 174, configured to send a first control signaling to at least one terminal, wherein the first control signaling indicates a PUCCH resource for sending the BFRQ allocated for the at least one terminal.

In an implementation, the first control signaling also indicates a correspondence between a terminal identification and the PUCCH resource and the candidate beam of the terminal, based on this, as shown in FIG. 17, the determining module 172 may include: a determining sub-module 1721, configured to determine a terminal identified by an identification corresponding to the PUCCH resource for transmitting the BFRQ as the terminal having beam failure; a second determining sub-module 1722, configured to determine an index of a candidate beam corresponding to the PUCCH resource for transmitting the BFRQ and the terminal identification; and a third determining sub-module 1723, configured to determine the candidate beam of the terminal according to the index of the candidate beam.

In an implementation, the first control signaling also indicates a correspondence between a terminal identification and the PUCCH resource, and based on this, the determining module 172 can be configured to determine a terminal identified by an identification corresponding to the PUCCH resource for transmitting the BFRQ as the terminal having beam failure.

Figure 18:
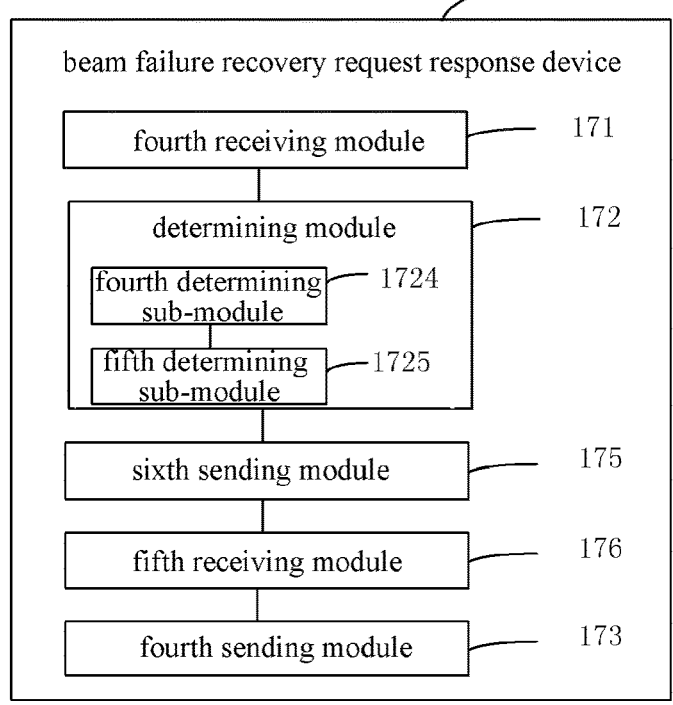
FIG. 18 is a block diagram showing a beam failure recovery request response device according to an exemplary embodiment.

FIG. 18 is a block diagram showing a beam failure recovery request response device according to an exemplary embodiment. As shown in FIG. 18, on the basis of the device 170, the device 190 may further include a sixth sending module 175, configured to send a second control signaling to the terminal, wherein the second control signaling indicates a grant free transmission resource pool; and a fifth receiving module 176, configured to receive a PUSCH message sent by the terminal on a transmission resource in the grant free transmission resource pool, wherein the PUSCH message includes the terminal identification and an index of a candidate beam selected by the terminal.

In an implementation, as shown in FIG. 18, the determining module 172 may further include: a fourth determining sub-module 1724, configured to determine a terminal identified by the identification in the PUSCH message as the terminal having beam failure; and a fifth determining sub-module 1725, configured to determine the candidate beam of the terminal according to the index of the candidate beam in the PUSCH message.

In an implementation, the beam failure recovery request response device may further include: a seventh sending module, configured to send a second control signaling to the terminal, wherein the second control signaling indicates a grant free transmission resource pool; and a sixth receiving module, configured to receive a PUSCH message sent by the terminal on a transmission resource in the grant free transmission resource pool, wherein the PUSCH message includes the terminal identification, an index of at least one candidate beam selected by the terminal and quality information of each of the at least one candidate beam.

Figure 19:
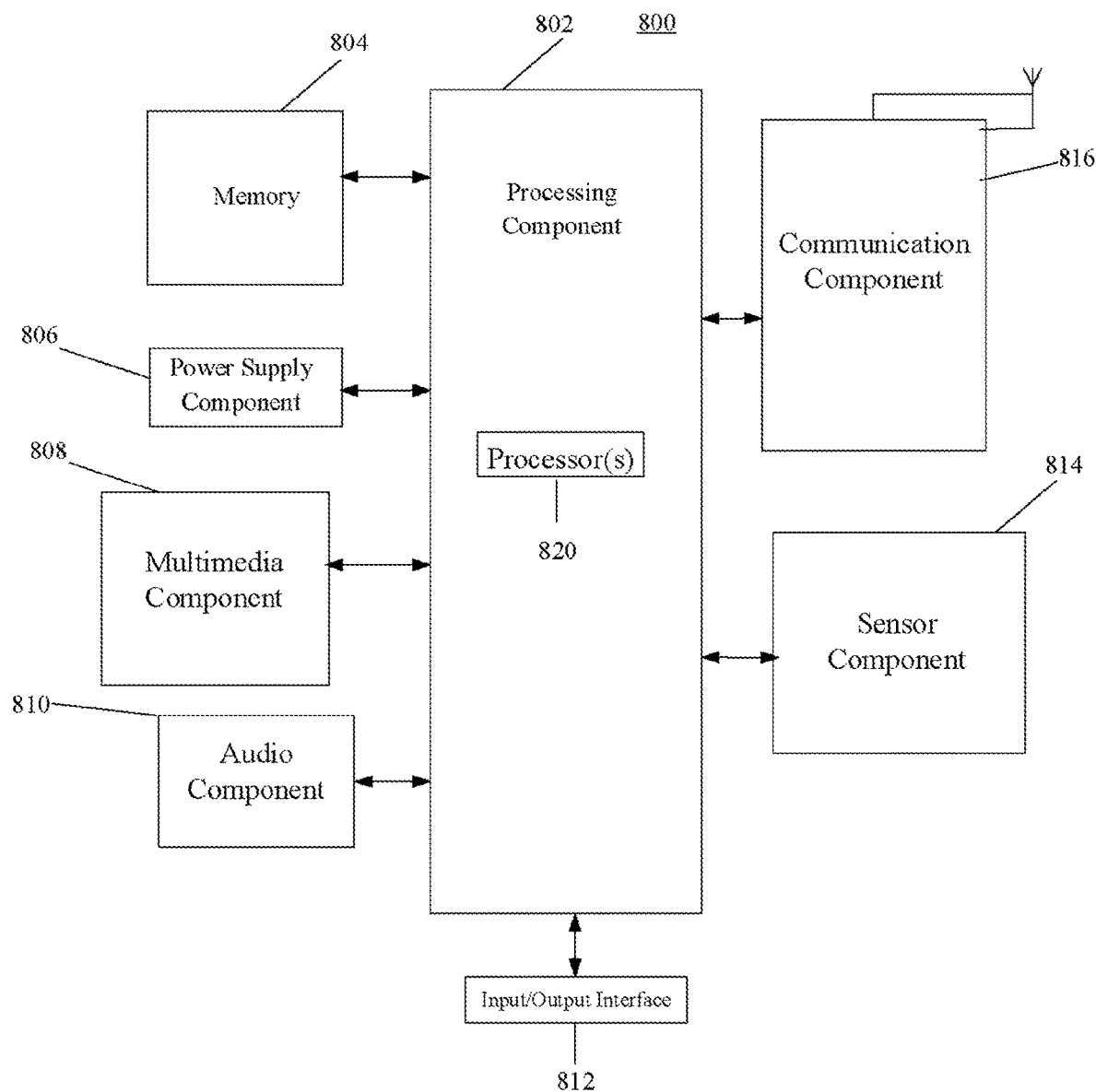
FIG. 19 is a block diagram showing a beam failure recovery request sending device according to an exemplary embodiment.

FIG. 19 is a block diagram showing a beam failure recovery request sending device according to an exemplary embodiment. For example, the device 800 may be a mobile phone, a computer, a digital broadcasting terminal, a messaging device, a game console, a tablet device, a medical device, a fitness device, a personal digital assistant, etc.

Referring to FIG. 19, the device 800 may include one or more of the following components: a processing component 802, memory 804, a power component 806, a multimedia component 808, an audio component 810, an input/output (I/O) interface 812, a sensor component 814, and a communication component 816.

The processing component 802 typically controls the overall operations of the device 800, such as the operations associated with display, telephone calls, data communications, camera operations, and recording operations. The processing component 802 can include one or more processors 820 to execute instructions to perform all or part of the steps in the above-described methods. Moreover, the processing component 802 can include one or more modules to facilitate the interaction between the processing component 802 and other components. For example, the processing component 802 can include a multimedia module to facilitate the interaction between the multimedia component 808 and the processing component 802.

The memory 804 is configured to store various types of data to support the operation of the device 800. Examples of such data include instructions for any application or method operated on device 800, such as the contact data, the phone book data, messages, pictures, videos, and the like. The memory 804 can be implemented by any type of volatile or non-volatile storage device, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 can include a power management system, one or more power sources, and other components associated with the generation, management, and distribution of power in the device 800.

The multimedia component 808 includes a screen providing an output interface between the device 800 and the user t. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. When the device 800 is in an operation mode, such as a photographing mode or a video mode, the front camera and/or the rear camera can receive external multimedia datum. Each of the front camera and the rear camera may be a fixed optical lens system or have focus and optical zoom capability.

The audio component 810 is configured to output and/or input an audio signal. For example, the audio component 810 includes a microphone (MIC) configured to receive an external audio signal when the device 800 is in an operation mode, such as a call mode, a recording mode, and a voice recognition mode. The received audio signal may be further stored in the memory 804 or sent via the communication component 816. In some embodiments, the audio component 810 also includes a speaker for outputting the audio signal.

The I/O interface 812 provides an interface between the processing component 802 and peripheral interface modules, such as a keyboard, a click wheel, buttons, and the like. These buttons may include, but are not limited to, a home button, a volume button, a starting button, and a locking button.

The sensor component 814 includes one or more sensors for providing status assessments of various aspects of the device 800. For example, the sensor component 814 can detect an open/closed status of the device 800, relative positioning of components, such as the display and the keypad of the device 800. The sensor component 814 can also detect a change in position of one component of the device 800 or the device 800, the presence or absence of user contact with the device 800, an orientation, or an acceleration/deceleration of the device 800, and a change in temperature of the device 800. The sensor component 814 can include a proximity sensor configured to detect the presence of nearby objects without any physical contact. The sensor component 814 can also include a light sensor, such as a CMOS or CCD image sensor, configured to use in imaging applications. In some embodiments, the sensor component 814 can also include an accelerometer sensor, a gyroscope sensor, a magnetic sensor, a pressure sensor, or a temperature sensor.

The communication component 816 is configured to facilitate wired or wireless communication between the device 800 and other devices. The device 800 can access a wireless network based on a communication standard, such as WiFi, 2G or 3G, or a combination thereof. In an exemplary embodiment, the communication component 816 receives broadcast signals or broadcast associated information from an external broadcast management system via a broadcast channel. In an exemplary embodiment, the communication component 816 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In an exemplary embodiment, the device 800 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components.

In an exemplary embodiment, there is also provided a non-transitory computer-readable storage medium including instructions, such as the memory 804 including instructions. The instructions can be executed by the processor 820 of the device 800 to carry out the foregoing methods. For example, the non-transitory computer-readable storage medium may be a ROM, a random-access memory (RAM), a CD-ROM, a magnetic tape, a floppy disk, an optical data storage device, etc.

Figure 20:
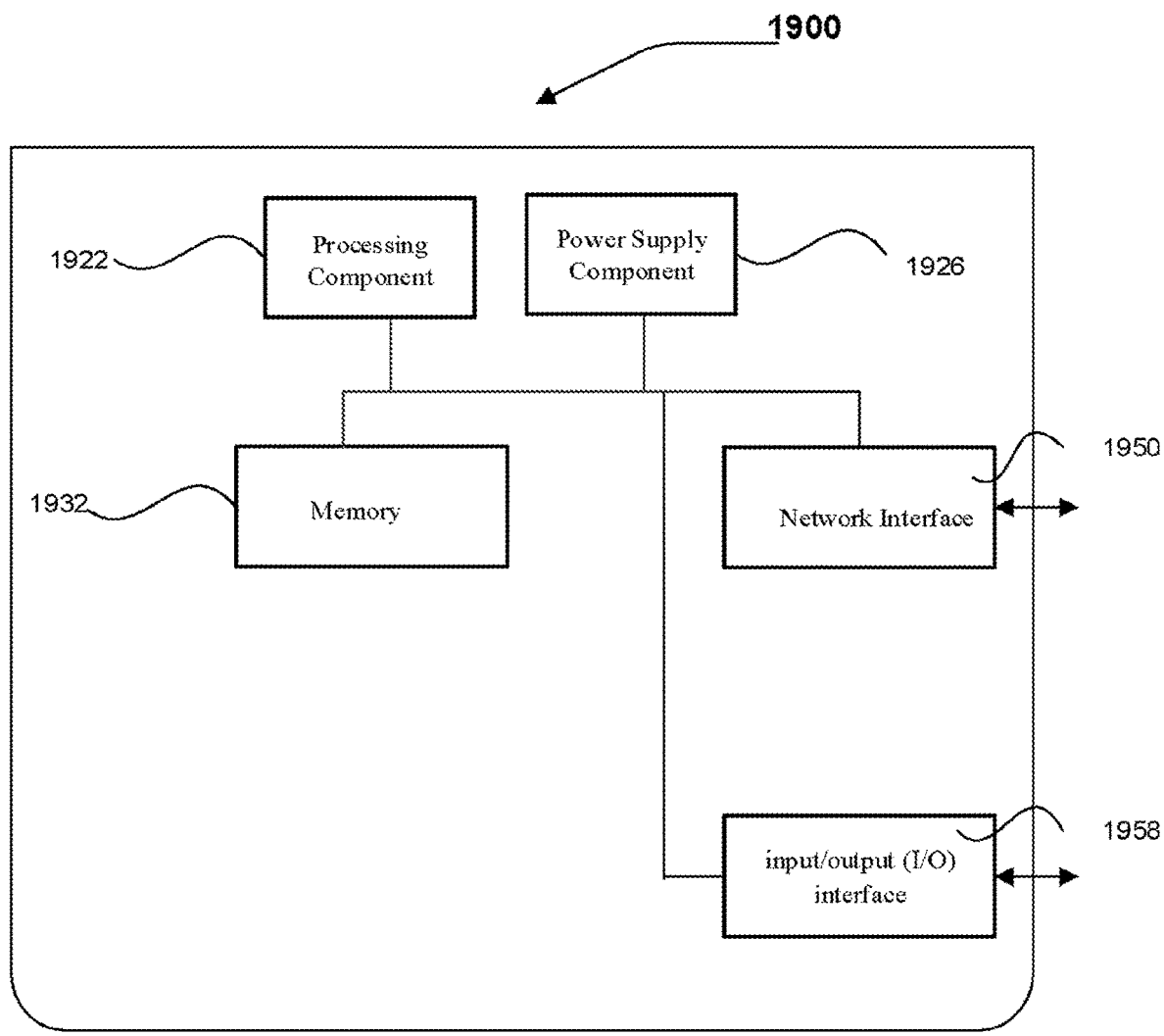
FIG. 20 is a block diagram showing a beam failure recovery request response device according to an exemplary embodiment.

FIG. 20 is a block diagram showing a beam failure recovery request response device. For example, the device 1900 may be provided as a server. Referring to FIG. 20, the device 1900 includes a processing component 1922, which further includes one or more processors, and memory resources represented by the memory 1932 for storing instructions executable by the processing component 1922, such as application programs. The application program stored in the memory 1932 may include one or more modules each of which corresponds to a set of instructions. In addition, the processing component 1922 is configured to execute instructions to perform the aforementioned beam failure recovery request response method.

The device 1900 may also include a power supply component 1926 configured to perform power management of the device 1900, a wired or wireless Network Interface 1950 configured to connect the device 1900 to a network, and an input/output (I/O) interface 1958. The device 1900 can operate based on an operating system stored in the memory 1932, such as WINDOWS SERVER™, MAC OS X™, UNIX™, LINUX™, FREEBSD™ or the like.

In an exemplary embodiment, there is also provided a non-transitory computer-readable storage medium including instructions, such as the memory 1932 including instructions. The instructions can be executed by the processor 1922 of the device 1900 to carry out the foregoing methods. For example, the non-transitory computer-readable storage medium may be a ROM, a random access memory (RAM), a CD-ROM, a magnetic tape, a floppy disk, an optical data storage device, etc.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A beam failure recovery request sending method, applied to a terminal, and the method comprising:
   searching for a candidate beam after a beam failure event occurs in the terminal;
   using a physical uplink control channel, PUCCH, resource to send a beam failure recovery request, BFRQ, to a base station after finding at least one candidate beam, wherein the PUCCH resource comprises a PUCCH resource pre-allocated for the terminal by the base station or a PUCCH resource in a preset format;
   receiving a second control signaling sent by the base station, wherein the second control signaling indicates a grant free transmission resource pool; and
   using a transmission resource in the grant free transmission resource pool to send a physical uplink shared channel, PUSCH, message to the base station when sending the BFRQ to the base station, or after sending the BFRQ to the base station, wherein the PUSCH message comprises a terminal identification and an index of the candidate beam selected by the terminal;
   wherein using the transmission resource in the grant free transmission resource pool to send the PUSCH message to the base station comprises:
   using the transmission resource in the grant free transmission resource pool to repeatedly send the PUSCH message to the base station until the number of times for sending the PUSCH message reaches a threshold or a feedback message to the PUSCH message is received from the base station.

2. The method according to claim 1, wherein the method further comprises:
   receiving a first control signaling sent by the base station, wherein the first control signaling indicates a PUCCH resource for sending the BFRQ allocated for the terminal.

3. The method according to claim 2, wherein the first control signaling also indicates a correspondence between the PUCCH resource and a terminal identification and an index of the candidate beam of the terminal, and using the PUCCH resource to send the BFRQ to the base station comprises: using a PUCCH resource corresponding to the terminal identification and the index of the candidate beam of the terminal to send the BFRQ to the base station.

4. The method according to claim 2, wherein the first control signaling also indicates a correspondence between the PUCCH resource and a terminal identification, and
   using the PUCCH resource to send the BFRQ to the base station comprises:
   using a PUCCH resource corresponding to the terminal identification to send the BFRQ to the base station.

5. The method according to claim 1, wherein the PUCCH resource in the preset format comprises: a PUCCH resource in a PUCCH format that is configured to carry multiple bits, when the PUCCH resource in the preset format is used to send the BFRQ to the base station, the BFRQ comprises: an index of at least one candidate beam selected by the terminal and quality information of each of the at least one candidate beam.

6. A beam failure recovery request sending device implementing the method of claim 1, the device comprising:
   a processor; and
   memory for storing executable instructions of the processor;
   wherein, the processor is configured to perform steps of the method.

7. A communication system implementing the method of claim 1, comprising the terminal, wherein the terminal is configured to transmit the BFRQ with the PUCCH resource, to thereby reduce a time delay of transmitting the BFRQ and informing the base station of the beam failure event and the candidate beam.

8. The communication system of claim 7, further comprising the base station, wherein the base station is configured to:
   receive the BFRQ transmitted based on the PUCCH resource;
   determine the terminal having beam failure and the candidate beam of the terminal; and
   send a response message to the BFRQ to the terminal through the candidate beam.

9. A beam failure recovery request sending method, applied to a terminal, and the method comprising:
   searching for a candidate beam after a beam failure event occurs in the terminal;

using a physical uplink control channel, PUCCH, resource to send a beam failure recovery request, BFRQ, to a base station after finding at least one candidate beam, wherein the PUCCH resource comprises a PUCCH resource pre-allocated for the terminal by the base station or a PUCCH resource in a preset format;

receiving a second control signaling sent by the base station, wherein the second control signaling indicates a grant free transmission resource pool; and using a transmission resource in the grant free transmission resource pool to send a physical uplink shared channel, PUSCH, message to the base station when sending the BFRQ to the base station, or after sending the BFRQ to the base station, wherein the PUSCH message comprises a terminal identification, an index of at least one candidate beam selected by the terminal and quality information of each of the at least one candidate beam;

wherein using the transmission resource in the grant free transmission resource pool to send the PUSCH message to the base station comprises:

using the transmission resource in the grant free transmission resource pool to repeatedly send the PUSCH message to the base station until the number of times for sending the PUSCH message reaches a threshold or a feedback message to the PUSCH message is received from the base station.

10. The method according to claim 9, wherein the method further comprises:

receiving a first control signaling sent by the base station, wherein the first control signaling indicates a PUCCH resource for sending the BFRQ allocated for the terminal.

11. The method according to claim 10, wherein the first control signaling also indicates a correspondence between the PUCCH resource and a terminal identification and an index of the candidate beam of the terminal, and using the PUCCH resource to send the BFRQ to the base station comprises: using a PUCCH resource corresponding to the terminal identification and the index of the candidate beam of the terminal to send the BFRQ to the base station.

12. The method according to claim 10, wherein the first control signaling also indicates a correspondence between the PUCCH resource and a terminal identification, and using the PUCCH resource to send the BFRQ to the base station comprises:

using a PUCCH resource corresponding to the terminal identification to send the BFRQ to the base station.

13. The method according to claim 9, wherein the PUCCH resource in the preset format comprises: a PUCCH resource in a PUCCH format that is configured to carry multiple bits, when the PUCCH resource in the preset format is used to send the BFRQ to the base station, the BFRQ comprises: an index of at least one candidate beam selected by the terminal and quality information of each of the at least one candidate beam.

14. A beam failure recovery request sending device implementing the method of claim 9, the device comprising:

a processor; and a memory for storing executable instructions of the processor;

wherein, the processor is configured to perform steps of the method.

15. A beam failure recovery request response method, applied to a base station, and the method comprising:

receiving a beam failure recovery request, BFRQ, transmitted based on a physical uplink control channel, PUCCH, resource, wherein the PUCCH resource comprises a PUCCH resource pre-allocated for a terminal by the base station or a PUCCH resource in a preset format;

determining a terminal having beam failure and a candidate beam of the terminal;

sending a response message to the BFRQ to the terminal through the candidate beam;

sending a second control signaling to the terminal, wherein the second control signaling indicates a grant free transmission resource pool;

receiving a physical uplink shared channel, PUSCH, message sent by the terminal on a transmission resource in the grant free transmission resource pool, wherein the PUSCH message comprises a terminal identification and an index of the candidate beam selected by the terminal, or the PUSCH message comprises a terminal identification, an index of at least one candidate beam selected by the terminal and quality information of each of the at least one candidate beam; and sending a feedback message to the PUSCH message;

wherein the PUSCH message is repeatedly sent by the terminal by using the transmission resource in the grant free transmission resource pool until the number of times for sending the PUSCH message reaches a threshold or until the feedback message is received.

16. The method according to claim 15, wherein the method further comprises:

sending a first control signaling to at least one terminal, wherein the first control signaling indicates a PUCCH resource for sending the BFRQ allocated for the at least one terminal.

17. The method according to claim 16, wherein the first control signaling also indicates a correspondence between a terminal identification and the PUCCH resource and the candidate beam of the terminal, and determining the terminal having beam failure and the candidate beam of the terminal comprises:

determining a terminal identified by an identification corresponding to the PUCCH resource for transmitting the BFRQ as the terminal having beam failure;

determining an index of the candidate beam corresponding to the PUCCH resource for transmitting the BFRQ and the terminal identification; and determining the candidate beam of the terminal according to the index of the candidate beam.

18. The method according to claim 16, wherein the first control signaling also indicates a correspondence between a terminal identification and the PUCCH resource, and determining the terminal having beam failure comprises:

determining a terminal identified by an identification corresponding to the PUCCH resource for transmitting the BFRQ as the terminal having beam failure.

19. The method according to claim 15, wherein determining the terminal having beam failure and the candidate beam of the terminal comprises:

determining a terminal identified by the identification in the PUSCH message as the terminal having beam failure; and determining the candidate beam of the terminal according to the index of the candidate beam in the PUSCH message.

20. A beam failure recovery request response device implementing the method of claim 15, the device comprising:
- a processor; and
- memory for storing executable instructions of the processor;
- wherein, the processor is configured to perform steps of the method.

* * * * *